US008173146B2

(12) United States Patent
Leroy

(10) Patent No.: US 8,173,146 B2
(45) Date of Patent: May 8, 2012

(54) STOMA WIPE AND ADHESIVE REMOVER AND METHOD

(75) Inventor: John L. Leroy, White Lake, MI (US)

(73) Assignee: Safen'Simple LLC, Clarkston, MI (US)

( * ) Notice: Subject to any disclaimer, the term of this patent is extended or adjusted under 35 U.S.C. 154(b) by 333 days.

(21) Appl. No.: 12/597,437

(22) PCT Filed: Apr. 22, 2008

(86) PCT No.: PCT/US2008/005158

§ 371 (c)(1), (2), (4) Date: Oct. 23, 2009

(87) PCT Pub. No.: WO2008/133868

PCT Pub. Date: Nov. 6, 2008

(65) Prior Publication Data

US 2010/0120646 A1 May 13, 2010

Related U.S. Application Data

(60) Provisional application No. 60/913,339, filed on Apr. 23, 2007.

(51) Int. Cl.
*A01N 25/34* (2006.01)

(52) U.S. Cl. ........................................................ 424/402

(58) Field of Classification Search ........................ None
See application file for complete search history.

(56) References Cited

U.S. PATENT DOCUMENTS

| | | | |
|---|---|---|---|
| 4,096,311 | A | 6/1978 | Pietreniak |
| 4,387,713 | A | 6/1983 | Calanni |
| 4,772,501 | A | 9/1988 | Johnson et al. |
| 4,904,524 | A | 2/1990 | Yoh |
| 4,941,995 | A | 7/1990 | Richards |
| 4,987,632 | A | 1/1991 | Rowe et al. |
| 4,987,893 | A | 1/1991 | Salamone et al. |

(Continued)

FOREIGN PATENT DOCUMENTS

| | | |
|---|---|---|
| EP | 0 240 009 | 11/1990 |

(Continued)

OTHER PUBLICATIONS

Lazarov et al., "Allergic contact dermatitis from the adhesive remover wipe of stoma bags," Medline, vol. 39, No. 1, pp. 48-49, Jul. 1988.

*Primary Examiner* — Bethany Barham

(74) *Attorney, Agent, or Firm* — Harness, Dickey & Pierce, P.L.C.

(57) ABSTRACT

A stoma wipe and adhesive remover is for use by an ostomy patient in cleaning a stoma and the area of skin surrounding the stoma, also known as the peristomal skin. The stoma wipe includes a convenient, pre-moistened and disposable towelette. The towelette includes an absorbent fibrous web of material into which is absorbed a liquid cleaning solution having a soap component, an emulsifying component, a water component and an antifungal component. The wipes can be packaged in a convenient, portable, re-sealable package. The stoma wipe is suitable for cleaning a stoma and its surrounding skin area without causing irritation to the stoma and the surrounding skin area, while at the same time removing adhesive residue from an ostomy appliance. The cleaning of the skin and removing old adhesive residue improves adherence of the stoma pouch to the skin area surrounding the stoma.

32 Claims, 1 Drawing Sheet

U.S. PATENT DOCUMENTS 5,013,307 A 5/1991 Broida
5,103,812 A 4/1992 Salamone et al.
5,203,806 A 4/1993 Broida
5,284,833 A 2/1994 McAnalley et al.
5,384,125 A 1/1995 DiPippo et al.
5,529,784 A 6/1996 DiPippo et al.
5,629,081 A 5/1997 Richards et al.
5,648,083 A 7/1997 Blieszner et al.
5,691,289 A 11/1997 Purcell et al.
5,702,992 A 12/1997 Martin et al.
5,753,257 A 5/1998 DiPippo et al.
6,033,675 A 3/2000 DiPippo et al.
6,071,867 A 6/2000 Purcell et al.
6,121,165 A 9/2000 Mackey et al.
6,164,441 A * 12/2000 Guy et al. .................... 206/210
6,200,939 B1 3/2001 Maurer
6,258,368 B1 7/2001 Beerse et al.
6,270,878 B1 8/2001 Wegele et al.
6,280,758 B1 8/2001 Warren et al.
6,287,583 B1 9/2001 Warren et al.
6,319,835 B1 11/2001 Sahbari et al.
6,328,811 B1 12/2001 Martin et al.
6,340,663 B1 1/2002 Delco et al.
6,346,506 B1 2/2002 Julemont
6,358,516 B1 3/2002 Harod
6,380,152 B1 4/2002 Julemont et al.
6,410,499 B1 6/2002 Julemont et al.
6,423,329 B1 7/2002 Sine et al.
6,429,182 B1 8/2002 Julemont et al.
6,429,183 B1 8/2002 Leonard et al.
6,436,892 B1 8/2002 Leonard et al.
6,448,462 B2 9/2002 Groitzsch et al.
6,486,104 B2 11/2002 Patzer et al.
6,495,151 B2 12/2002 McAtee et al.
6,495,508 B1 12/2002 Leonard et al.
6,579,570 B1 6/2003 Lang et al.
6,586,385 B1 7/2003 Wisniewski et al.
6,613,729 B1 9/2003 Cole et al.
6,641,826 B2 11/2003 Durden
6,649,584 B2 11/2003 Wisniewski et al.
6,680,287 B2 1/2004 Wisniewski et al.
6,702,147 B2 3/2004 Ashford
6,713,414 B1 3/2004 Pomplun et al.
6,716,805 B1 4/2004 Sherry et al.
6,730,621 B2 5/2004 Gott et al.
6,737,068 B2 5/2004 Durden
6,750,192 B2 6/2004 Yamashita et al.
6,753,063 B1 6/2004 Pung et al.
6,764,988 B2 7/2004 Koenig et al.
6,797,399 B2 9/2004 Weuthen et al.
6,797,400 B2 9/2004 Weuthen et al.
6,806,213 B2 10/2004 Brooks
6,936,580 B2 8/2005 Sherry et al.
6,986,897 B1 1/2006 Roberts et al.
6,992,054 B2 1/2006 Lee et al.
7,030,046 B2 4/2006 Wong et al.
7,074,747 B1 7/2006 Lukenbach et al.
7,101,612 B2 9/2006 Lang et al.
7,229,956 B2 6/2007 Bedford et al.
7,250,392 B1 7/2007 Leonard et al.
7,276,459 B1 10/2007 Lang et al.
7,323,438 B2 1/2008 Hedges et al.
7,725,392 B2 5/2010 King
2001/0025153 A1 9/2001 Groitzsch et al.
2002/0031486 A1 3/2002 Lunsmann et al.
2002/0071818 A1 6/2002 Cole et al.
2002/0155281 A1 10/2002 Lang et al.
2002/0155772 A1 10/2002 Wong et al.
2002/0183216 A1 12/2002 Koenig et al.
2003/0019508 A1 1/2003 Tomarchio et al.
2003/0050201 A1 3/2003 Guillou et al.
2003/0072789 A1 4/2003 Durden
2003/0130636 A1 7/2003 Brock et al.
2003/0178436 A1 9/2003 Ashford
2003/0194425 A1 10/2003 Simon et al.
2004/0022833 A1 2/2004 Hartwig et al.
2004/0042986 A1 3/2004 Meyer et al.
2004/0136943 A1 7/2004 Tomokuni
2004/0204332 A1 10/2004 Dastbaz et al.
2004/0204333 A1 10/2004 Dobrin et al.
2004/0213754 A1 10/2004 Cole et al.
2004/0242097 A1 * 12/2004 Hasenoehrl et al. ............ 442/59
2005/0008680 A1 * 1/2005 Deckner et al. ............... 424/443
2005/0008681 A1 1/2005 Deckner et al.
2005/0025936 A1 2/2005 Snider et al.
2005/0048856 A1 3/2005 Hauser et al.
2005/0061686 A1 3/2005 Bedford et al.
2005/0095941 A1 5/2005 Coronado et al.
2005/0107282 A1 5/2005 Ford et al.
2005/0113277 A1 5/2005 Sherry et al.
2005/0133174 A1 6/2005 Gorley et al.
2005/0150784 A1 7/2005 Sanchez et al.
2005/0152953 A1 7/2005 Wild et al.
2005/0159063 A1 7/2005 Hill et al.
2005/0202190 A1 9/2005 Ledger et al.
2005/0220847 A1 10/2005 Benjamin et al.
2005/0250402 A1 11/2005 Wild et al.
2005/0250669 A1 11/2005 Queen
2006/0039956 A1 2/2006 Hensen et al.
2006/0141014 A1 6/2006 Eknoian et al.
2006/0161089 A1 7/2006 Thierauf et al.
2006/0171971 A1 8/2006 Marsh et al.
2006/0252324 A1 11/2006 Julemont et al.
2006/0257348 A1 11/2006 Walters et al.
2006/0264344 A1 11/2006 Goldberg et al.
2007/0111910 A1 5/2007 Walters et al.
2007/0141936 A1 6/2007 Bunyard et al.
2007/0155645 A1 7/2007 Eisfeld et al.
2007/0254543 A1 11/2007 Bunyard et al.

FOREIGN PATENT DOCUMENTS

EP 1 059 032 12/2000
EP 0 806 933 8/2002
EP 1 405 634 4/2007
GB 2 011 786 7/1979
GB 2 158 345 11/1985
GB 2 328 451 2/1999
WO WO 93/18102 9/1993
WO WO 99/24551 5/1999
WO WO 02/090483 11/2002
WO WO 03/050226 6/2003
WO WO 2004/054522 7/2004
WO WO 2004/056330 7/2004
WO WO 2005/025486 3/2005

* cited by examiner

STOMA WIPE AND ADHESIVE REMOVER AND METHOD

CROSS REFERENCE TO RELATED APPLICATIONS

This application claims the benefit of U.S. provisional application Ser. No. 60/913,339 filed Apr. 23, 2007. The disclosure of the above application is incorporated herein by reference.

FIELD

The present disclosure relates to a convenient and disposable towelette wipe for use by ostomy patients for cleaning the stoma and the area around the stoma.

BACKGROUND

The statements in this section merely provide background information related to the present disclosure and may not constitute prior art.

In one aspect, a stoma is an artificial opening from the intestine on the abdominal wall usually created by a surgeon. A stoma is necessary when parts of the normal intestine must be bypassed, for example when bowel surgery has removed important lengths of the intestine, or when food cannot be taken by mouth. There are several types of stoma, depending on the part of the intestine or gut that forms the opening. A gastrostomy is an opening from the skin directly into the stomach to allow feeding. A jejunostomy is an opening from the first part of the small bowel, also used for feeding. An ileostomy is an opening from the small bowel to allow feces to leave the body without passing through the large bowel. A colonostomy is an opening from the large bowel, to allow feces to bypass the anus. Stomas may be temporary or permanent.

A stoma is carefully sited on the abdominal wall so it can be hidden and still function. With a colostomy or an ileostomy a special bag is attached to the site that collects the feces. The opening on the abdominal wall must be well cared for because bowel contents can irritate the skin. The use of appliances such as a bag and seal over and around the stoma can, in addition, cause damage to the skin from frequent removal, and from allergy to the materials used. The length of time an ostomate will wear a given ostomy collection appliance, also known as an ostomy pouch can vary by the individual. Most ostomy appliances are secured to the ostomate's peristomal skin with an adhesive to secure the pouch around the stoma. When the ostomy appliance or pouch is removed off the ostomate's skin an adhesive residue from the ostomy appliance is typically left on the ostomate's skin.

Patients with a stoma condition have long been using towels soaked with soap and water in order to clean the peristomal skin. This cleaning is necessary to remove ostomy appliance residue, skin oils, normal dirt build up on the skin in the area around the stoma, and excretions from the neighboring stoma. Using soap and water to clean around the peristomal skin helps prevent skin breakdown and assures adhesion between the peristomal skin area and the stoma pouch or ostomy appliance. These towels typically used are not disposable, nor do they provide convenience to the patient due to their size and that they require machine washing. Conventional towels do not allow the ostomy patient the convenience of portability for easy travel.

Another alternative for ostomy patients that is currently available are disposable, pre-moistened towelettes, such as baby wipes and the like. Such towelettes are typically available in convenient re-sealable packaging which can be portable. These towelettes, however, contain chemicals that reduce the adhesion characteristics between the stoma pouch and the peristomal skin and/or cause irritation to the ostomy patient at the stoma and the surrounding area. Consequently, even if an ostomy patient uses a disposable towelette to clean the peristomal skin, an additional cleaning is typically necessary (using a towel soaked in soap and water) in order to ensure that the stoma pouch can adequately adhere to the peristoma skin or the skin surrounding the stoma, and to reduce any irritation that is induced by the chemicals contained in the towelette.

Because none of the towelettes available today have been chemically formulated specifically for use by ostomy patients, there remains a need for a convenient, easily portable, pre-moistened towelette for cleaning a stoma and its surrounding area that does not irritate the stoma and surrounding area, and does not adversely affect the adhesion characteristics between the stoma and surrounding skin and the stoma pouch.

SUMMARY

A stoma wipe according to the present disclosure comprises a towelette for use by an ostomy patient in cleaning the peristomal skin and its surrounding area. Methods and kits are also provided for use of the wipes by the ostomy patient or a caregiver.

In one embodiment, the stoma wipe of the present disclosure comprises a pre-moistened disposable towelette that is formulated specifically for ostomy patients. The towelette includes an absorbent, fibrous web material into which is absorbed a liquid solution including a soap component, a water component, and an antifungal component. In general, the liquid solution can include from about 0.5% to about 20% of the soap component, about 80% to about 99.5% of the water component, and less than 1.0% of the antifungal component. The liquid solution is formulated to provide effective adhesive removal as well as effective cleaning or cleansing around the stoma.

The stoma wipe according to the present disclosure is suitable for use by an ostomy patient for cleaning the peristomal skin and its surrounding area. The stoma wipe of the present disclosure is specifically formulated so as to reduce or eliminate the possibility for irritation to the stoma and surrounding area, while not adversely impacting the ability for the stoma pouch to adequately adhere to the stoma and the surrounding area.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
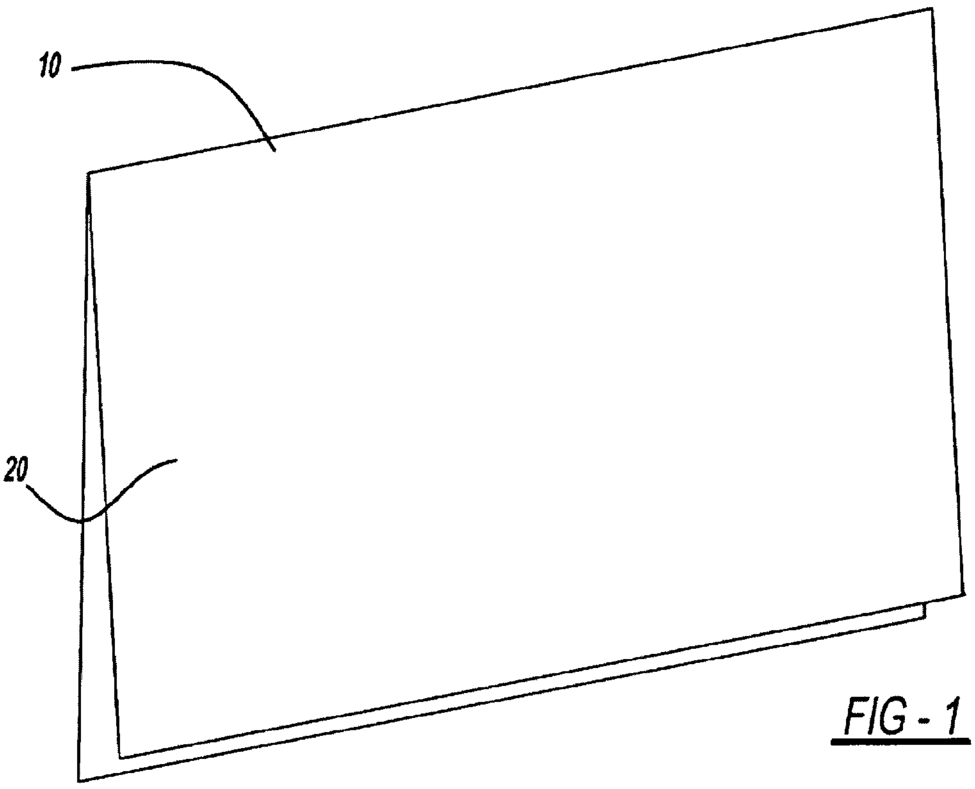
FIG. 1 shows a stoma wipe of the present disclosure.

The following description is merely exemplary in nature and is not intended to limit the present disclosure, application, or uses.

In various embodiments, use of the stoma wipe of the present disclosure provides an ostomy patient with a convenient, disposable, pre-moistened towelette suitable for use in cleaning the area of skin around a stoma. Conveniently, it functions both as an adhesive remover and as a cleansing soap or detergent, so that the necessary maintenance involved with an ostomy bag is accomplished in a single step of using the wipes on the peristomal skin. The patient thus saves considerable time in maintenance, in addition to the convenience provided by the portable and disposable nature of the wipe. The stoma wipe of the present disclosure is intended to reduce or eliminate irritation to the stoma and the peristomal skin that can be caused by conventional pre-moistened towelettes. In addition, the stoma wipe of the present disclosure is intended not to adversely affect the adhesion of the ostomy bag or pouch to and the stoma and surrounding area.

In one embodiment, the invention provides a method of cleansing the area of a stoma, including the peristomal skin in an ostomy patient, the method comprising contacting the peristomal skin around the stoma with a formulated wipe. The wipe comprises a substrate impregnated with a non-irritating cleaning composition. The cleaning composition consists essentially of water, an anionic detergent, a non-ionic surfactant, an antimicrobially effective amount of a preservative composition, and preferably a carboxylic acid in an amount sufficient to maintain the pH of the cleaning composition between about 5.5 and about 7. In a preferred embodiment, the cleaning composition is essentially free of oils, lotions, fragrances, volatile solvents, and other components that would interfere with the method of cleansing the peristomal skin around the stoma. The cleaning composition is impregnated into the substrate preferably in a way such as not to lead to lathering or sudsing upon using of the formulated wipe to cleanse the skin. Preferred components for the detergent, surfactant, preservative, and carboxylic acid of the cleaning composition are described further herein.

In another embodiment, a kit or packaged article is provided that comprises a plurality of formulated wipes along with instructions for use of the wipes by an ostomy patient or the patient's caregiver to clean the peristomal skin and/or to remove adhesive from around the patient's stoma. In various embodiments, the wipes comprise a substrate impregnated with a non-irritating cleaning composition as described herein. In particular embodiments, the wipes comprise a substrate such as a non-woven fabric that has a mild cleaning composition on at least the surface of the substrate, and where the cleaning composition is free of components that are volatile organic liquids, non-volatile organic liquids, fragrances, oils, lotions, or emollients. The mild cleaning composition consists essentially of water, an ionic surfactant, a nonionic detergent, an antimicrobially effective amount of a preservative composition, and preferably a carboxylic acid at a level sufficient to maintain the pH at about 5.5 to about 7. Various aspects of the substrate, the mild cleaning composition, and the instructions forming a part of the kit or packaged article are described further herein.

In another embodiment, a formulated wipe is provided that is suitable for use by an ostomy patient or the patient's caregiver to remove adhesive or clean the peristomal skin around the patient's stoma. The formulated wipes comprise a preferably a non-woven fabric substrate impregnated with a mild cleaning composition. In preferred embodiments, the cleaning composition is free of or essentially free of components that belong to the classes of volatile organic liquids, non-volatile organic liquids, oils, emollients, fragrances, or lotions. In a particular embodiment, the cleaning composition comprises water, a non-ionic surfactant; an imidazoline based amphoteric surfactant, an effective amount of preservative composition and a carboxylic acid such as citric acid.

As shown for an exemplary embodiment in FIG. 1, the stoma wipe of the present disclosure comprises an absorbent, fibrous web material into which is absorbed a liquid cleaning solution. The stoma wipe is of a size that is convenient and portable for the ostomy patient. The wipe may be of any size and shape as desired, such as a rectangle, square or circle, for example, that allows the convenience to the ostomy patient to carry the stoma wipe with them, as well as to be readily disposable after use. The stoma wipe may also be biodegradable and, therefore, flushable in sanitary and septic sewer systems.

The liquid cleaning solution generally comprises a soap or detergent component, a water component and an antifungal or antimicrobial component. In general, the liquid cleaning solution can include from about 0.5% to about 20% of the soap component, about 80% to about 99.5% the water component, and less than 1.0% of the antifungal component. In one formulation, the liquid cleaning solution is nominally 98% by volume of water and nominally 2% by volume of soap, with the antifungal agent as a minor additive. In another formulation, the liquid cleaning solution comprises about 1% or less by volume of a liquid soap, about 99% or more by volume of distilled water, and substantially less than 1% by volume of an antifungal agent.

In a preferred embodiment, the ionic detergent of the cleaning compositions of the invention includes an imidazoline based amphoteric surfactant. These are exemplified by and also go by the name of alkylamido alkylamines.

Alkylamido alkylamines, or imidazoline-based amphoteric surfactants, exhibit the structure:

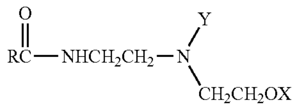

where R is a saturated or unsaturated hydrocarbyl group containing 8-22 carbon atoms, esp 12-18 atoms; where X may be hydrogen or —$CH_2COOM^+$ or —$CH_2CH_2COO^-M^+$; and where Y may be —$CH_2COOM^+$, or —$CH_2CH_2COOM^+$, or $CH_2CHOHCH_2SO_3$-$M^+$, or $CH_2CHOHCH_2OPO_3^-H^+M^+$. $M^+$ represents a cation that is usually $Na^+$.

Occasionally the cation $M^+$ is an alkanolamine cation, as in, e.g., DEA-Cocoamphodipropionate. If the pH is favorable, the amino nitrogen may be quaternized with an acidic substituent, such as —$CH_2COO$—, to form a zwitterion. This diverse group of materials is prepared by reacting fatty acid derivatives with hydroxyethyl ethylenediamine; this yields a substituted imidazoline which is subsequently split during the reaction with e.g., chloroacetic acid to yield an amphoteric compound such as disodium caprylamphodiacetate.

The commercially available compounds in this class are fairly complicated mixtures of chemically related materials. Non-limiting examples include amphoacetates, amphodiacetates, amphopropionates, and amphodipropionates. Specific examples include those in the table.

| | | |
|---|---|---|
| Cocoamphodipropionic Acid | Disodium Laureth-5 Carboxyamphodiacetate | Sodium Caproamphopropionate |
| Cocobetainamido Amphopropionate | Disodium Lauroamphodiacetate | Sodium Capryloamphoacetate |
| DEA-cocamphodipropionate | Disodium Lauroamphodipropionate | Sodium Capryloamphohydroxypropysulfonate |
| Disodium caproamphodiacetate | Disodium Oleoamphodipropionate | Sodium Caprylamphopropionate |
| Disodium caproamphodipropionate | Disodium PPG-2-Isodecth-7 Carboxyamphodiacetate | Sodium Cocoabutteramphoacetate |
| Disodium Caprylamphodiacetate | Disodium Stearoamphodiacetate | Sodium Coamphoacetate |
| Disodium Capryloamphodipropionate | Disodium Tallowamphodiacetate | Sodium Cocoamphohydroxypropylsulfonate |
| Disodium Cocoamphocarboxyethylhydroxypropylsulfonate | Disodium Wheatgermamphodiacetate | Sodium Cocoamphopropionate |
| Disodium Cocoamphodiacetate | Lauroamphodipropionic Acid | Sodium Cornamphopropionate |
| Disodium Cocoamphodipropionate | Quaternium-85 | Sodium Isostearoamphoacetate |
| Disodium Isostearoamphodiacetate | Sodium Caproamphoacetate | Sodium Isostearoamphopropionate |
| Disodium Isostearoamphodipropionate | Sodium Caproamphohydroxypropylsulfonate | Sodium Lauroamphoacetate |
| Sodium Lauroampho PG-Acetate Phosphate | Sodium Peanutamphoacetate | Sodium Lauroamphohydroxypropysulfonate |
| Sodium Lauroamphopropionate | Sodium Ricinoleoamphoacetate | Sodium Tallamphopropionate |
| Sodium Myristoamphoacetate | Sodium Sesamphoacetate | Sodium Tallowamphoacetate |
| Sodium Oleoamphoacetate | Sodium Stearoamphoacetate | Sodium Undecylenoamphoacetate |
| Sodium Oleoamphohydroxypropylsulfonate | Sodium Stearoamphohydroxypropylsulfonate | Sodium Undecylenamphopropionate |
| Sodium Oleoamphopropionate | Sodium Stearoamphopropionate | Sodium Wheat Germamphoacetate |
| Sodium Olivamphoacetate | Sodium Sunflowerseedamphoacetate | Trisodium Lauroampho PG-Acetate Chloride Phosphate |
| Sodium Palmamphoacetate | Sodium Sweetalmondamphoacetate | |

In a preferred embodiment, the detergent component of the cleaning composition further comprises a nonionic surfactant. As is well known to those of skill in the art, nonionic surfactants include ethoxylated or polyethoxylated organic moieties such as alcohols, oils, fatty acids, sorbitan esters, and the like. Nonionic surfactants also include block copolymers such as ethylene oxide, propylene oxide block copolymer, exemplified by the Pluronic® surfactants of BASF Corporation.

Although the invention is not limited by theory, it is believed that the presence of the nonionic surfactant or detergent contributes to the ability of the formulated wipes to effectively remove ostomy bag adhesive from the skin during the necessarily frequent maintenance and replacement of the ostomy bag. Efficient removal of adhesive leads to more thorough cleaning, also saving time for the patient who can accomplish adhesive removal and cleaning with one operation. Effective adhesive removal during cleaning also leads to secure attachment of the replacement ostomy bag to the skin.

In various embodiments, the nonionic surfactant is selected for matching a HLB (hydrophile-lipophile balance) to provide effective and adhesive removal and cleaning. The HLB number is a well known parameter and can be calculated theoretically for any nonionic surfactant, when the structure is known. Tabulated values of HLB are available in the art, for example in the well-known treatise of McCutcheon's Emulsifiers and Detergents. Editions of McCutcheon's are published in North American and International versions every year.

In particular embodiments, the HLB of the nonionic surfactant ranges from about 10 to about 20; or from about 13 to about 17, or from about 14 to about 16.

In other embodiments, a nonionic surfactant is selected that has an HLB of from about 14.5 to about 15.5. In other embodiments, a non-ionic surfactant is chosen that has an HLB of about 15. Non-limiting examples of non-ionic surfactants include POE (20) sorbitan monostearate, polysorbate-60, PEG-20 sorbitan isostearate, PEG-10 sorbitan monolaurate, polyoxyethylene sorbitan (20) monooleate, POE (20) stearyl alcohol, POE (20) oleyl alcohol, polysorbate 80, PEG-60 almond glycerides, PEG-60 corn glycerides, PEG-45 palm kernel glycerides, Iso $C_{10}$ alcohol alkoxylate, PEG-20 glyceryl stearate; ethoxylated nonylphenol, and POE (20) cetyl alcohol.

In various embodiments, the HLB of a non-ionic surfactant is selected to provide suitable cleaning power in the wipe. In particular, although the invention is not limited by theory, it is believed that an HLB in the preferred range leads to selection of a surfactant that has advantageous properties as far as removal of ostomy bag adhesive from the skin. Many of the adhesives commonly used in ostomy applications are based on pressure sensitive adhesives containing various rubber-like organic molecules such as polybutadiene and polyisobutylene.

It is believed that the HLB of the nonionic surfactant contributes to the ability of the cleaning composition to remove such adhesive from the peristomal skin. In addition, the absence of components such as oils, lotions, and volatile organic solvents is believed to contribute to leaving the skin in a non-oily condition so that the ostomy adhesive can adhere to the skin when the appliance is re-installed after cleaning. The absence of volatile organic solvents is believed to contribute to the non-irritating nature of the cleaning composition.

The cleaning compositions further contain an antimicrobially effective amount of a preservative composition. The preservative composition is meant to protect the substrate in which the cleaning composition is impregnated from microbial degradation such as attack by bacteria. Components of preservative compositions are well known to those of skill in the art and include materials listed as preservatives or antimicrobial agents in such treatises as McCutcheon's Functional Materials. In a non-limiting embodiment, it has been found suitable to use a combination of 3-iodo-2-propynl-N-butylcarbamate and diazolidinyl urea as components of the preservative composition. For convenience, the carbamate preservative will also be referred to as iodopropynyl butylcarbamate, or simply IPBC.

The pH of the cleaning composition is preferably maintained in an acidic range, for example from about 5.5 to about 7, and preferably from about 5.5 to about 6.5. pH adjustment and maintenance of the cleaning composition can be accomplished by use of any non-toxic non-irritating buffer component that does not interfere with the operability of the wipes on peristomal skin. In a preferred embodiment, a carboxylic acid component is used to maintain the pH. In a preferred embodiment, citric acid is formulated into the cleaning composition to adjust the pH.

The composition of the liquid cleaning solution of the stoma wipe of the present disclosure is intended to reduce or eliminate the irritation that may be caused by conventional, pre-moistened towelettes and it can maintain the skin around the stoma without inducing its further breakdown. Since the stoma and surrounding area are very sensitive and easily irritated, the liquid cleaning solution provides a preferred alternative to conventional pre-moistened towelettes.

The stoma wipe of the present disclosure does not leave a residue on the stoma or surrounding area that would cause poor adhesion between the stoma and the stoma pouch. This make-up of the liquid cleaning solution is intended to prepare the stoma and surrounding area in order to promote good adhesion between the stoma pouch and the skin area surrounding the stoma.

The substrate used to make the formulated wipes is any substrate that can be impregnated with a cleaning composition at least on its surface to provide a suitable cleaning article for the peristomal skin. Thus, the substrate for the wipe is generally an absorbent or adsorbent material. In a preferred embodiment, it is a non-woven sheet, which is well known in the art. Non-woven sheets contain at least one layer that is made of wood pulp, a synthetic fiber, a blend of wood pulp and synthetic fiber, or a blend of synthetic fibers. Non-limiting examples of suitable synthetic fibers include polyester (such as polyethylene terephthalate fibers), rayon, viscose, nylon, polypropylene, polyethylene, and other cellulose polymers. The non-wovens may include sheet material that include melt blown, co-form, air laid, spun bond, wet laid, bonded, dash carded, web materials, hydro entangled (also known as spun laced) materials, and combinations thereof. As noted, the nonwovens can comprise synthetic fibers, natural fibers, or combinations thereof. A binder may or may not be present.

Non-woven sheets or fabrics are characterized by an areal weight that is dependent on the density of the fibers making up the sheet and the relative number of fibers per unit area. Suitable non-wovens have a range of areal weights. In non-limiting embodiments, non-woven fabrics are provided that have an areal weight from about 5 grams per square meter (abbreviated as $g/m^2$) to about 200 or to about 100 $g/m^2$. In various embodiments, the areal weight is from 10 to 100 $g/m^2$, for example 15-100 $g/m^2$, 15-90 $g/m^2$, 20-80 $g/m^2$, and so on. For example, an areal weight of about 40 $g/m^2$ has been found suitable. The non-wovens are commercially available in a range of areal weights from a number of commercial suppliers.

Other substrate materials capable of imbibing or impregnation with cleaning compositions include woven materials, such as those made from cotton fibers, from fibers of synthetic polymers, or from blends of cotton and synthetic fibers. Other suitable substrates include foam materials such as regenerated cellulose, polyurethane foams, and the like, which are used in making sponges. It will be appreciated that some of the substrates are suitable for providing wipes that are biodegradable and/or flushable, both of which are preferred in some embodiments.

The wipes can be individually sealed with a heat sealable or gluable thermoplastic overwrap. In other embodiments, the wipes can be packaged as numerous individual sheets which are then impregnated or contacted with the liquid cleaning ingredients for economical dispensing. In other embodiments, the wipes can be formed as a continuous web during the manufacturing process and loaded into a dispenser, such as canister with a closure, a paper or other material carton with a closure or fold, or a tub with a closure. The closure functions to seal the moistened wipes from the external environments and prevent drying. In various embodiments, a continuous web of wipes is preferably threaded through a thin opening in the top of the dispenser, such as through the closure. A means of sizing the desired length of the wipe form the web can be provided, such as a knife blade, serrated edge or other means of cutting the web to desired size. In alternative embodiments, the continuous web of wipes can be scored, perforated, folded, segmented, or partially cut into uniform or non-uniform sizes or lengths. In further embodiments, the wipes can be interleaved, so that the removal of one wipe advances the next and so forth.

In a preferred embodiment, the wipes are provided as individual square or rectangular sheets having dimensions suitable for convenient use by the ostomy patient. The wipes are preferably small enough to be stored and transported easily, yet large enough to provide adequate cleaning. No matter the size of the wipe, the mild cleaning composition impregnated into the wipe or present on at least on its surface provides the benefits of ease of use, lack of irritation, and compatibility with the operation of adhesives that install the ostomy appliance on the body.

Figure 2:
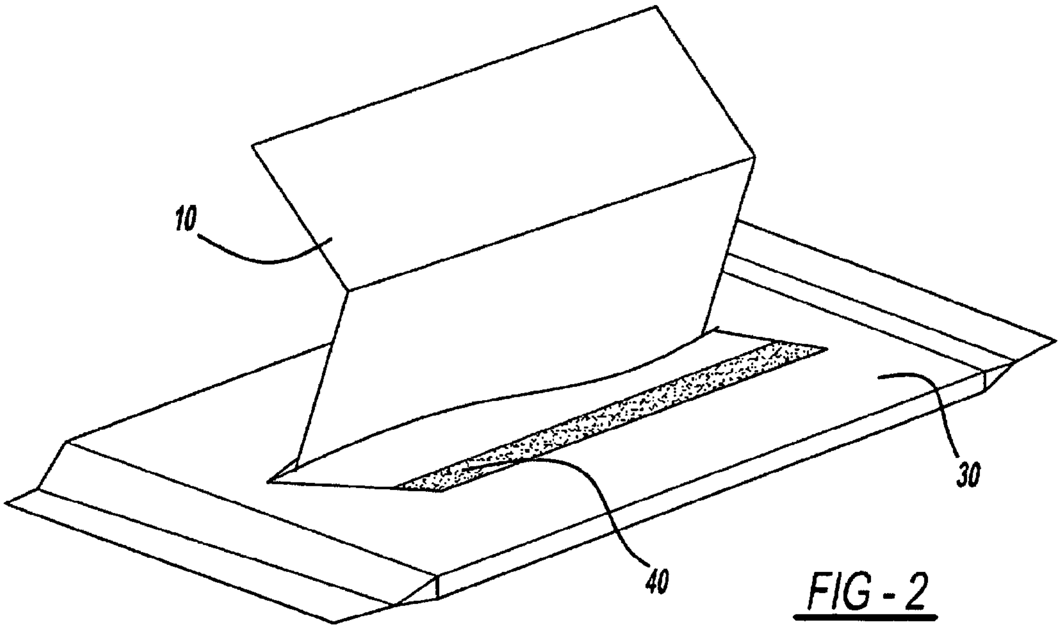
FIG. 2 shows the stoma wipe of FIG. 1 in a re-sealable package that dispenses the stoma wipe, preserves it, and keeps it clean.

As shown in FIG. 2, the stoma wipe of the present disclosure may be contained in a convenient, re-sealable package. The package keeps the stoma wipe clean and sanitary, and maintains an air-tight seal that prevents the liquid cleaning solution from breaking down so the pre-moistened wipes do not dry out, thereby increasing the wipe's shelf life.

In addition, the packaging enables the wipes to be conveniently available to the ostomy patient. The stoma wipes can be disposed in the package in a nested configuration so that as one wipe is removed by, for example, being pulled from the package, a portion of the next wipe is made available to the ostomy patient for easy access. Also, the packaging enables the wipes to be portable. This portability, together with its disposability, provides the ostomy patient a greater degree of freedom as the need arises to change the stoma pouch and clean the peristomal skin and surrounding area.

In various embodiments, kits are provided that contain a plurality of the formulated wipes described herein and further contain some kind of instructions for use of the wipes by an ostomy patient or the patient's caregiver to clean the area of skin around the stoma. Such instructions can be provided in written form, in cartoon or pictorial form or in combinations. In various embodiments, the instructions are provided inside a container or separately packaged inside a container with the wipes. In other embodiments, the instructions can be provided as part of the packaging, such as printed instructions on the outside of the container that holds the wipes. In other embodiments, the instructions can be provided as part of a point of sale display or provided to the purchaser or user when the product is dispensed, as from a pharmacy, or from a supply house, through the mail or other delivery service. It is further contemplated to provide the instructions in more than one of the ways just described and/or to provide the instructions in foreign languages or in multilingual embodiments as the need may arise.

As contemplated herein, kits including instructions for use of the wipes can contain a plurality of wipes based on any of the substrates described herein and impregnated with any of the cleaning compositions. As noted, the formulated wipes are provided in any form or shape that is suitable for their use by the ostomy patient or the patient's caregiver in cleaning the area around the peristomal skin. Non-limiting examples of forms of the wipes include square or rectangular sheets, rolls with or without perforation, mitts that fit around a user's hand for ease of use, and the like. In a preferred embodiment, the formulated wipes are provided in a resealable air tight package for easy dispensing.

In various embodiments, the wipes are folded and stacked. They may be folded in any of various folding patterns, such as C folding, Z folding, and quarter folding. Alternatively, the wipes may include a continuous strip of material that has perforations between each wipe and which may be arranged in a stack or wound into a roll for dispensing, one after the other, from a container.

The wipes are manufactured by applying a cleaning composition to a substrate. Any suitable application method can be used, such as without limitation dipping, immersion, spraying, and the like. The process can be automated or carried out by hand. The amount of cleaning composition applied can be varied to provide a desired loading of detergent for cleaning the peristomal skin. After application of a composition comprising water, if desired excess composition can be removed by shaking, rolling, drip drying, and the like. If desired, the amount of composition applied per unit area of the substrate can be controlled during a spraying or similar operation by metering the composition, by moving the substrate past an application source at a controlled rate, or by other means.

In preferred embodiments, the cleaning composition is applied to the substrate using a solution of components that is relatively dilute, in order to limit the amount of components added to the substrate along with the solvent water. It has been found suitable to apply solutions of components that contain 95% or more by weight water, as demonstrated in the working Example given below. Cleaning composition is applied to the substrate at a rate suitable to give a desired coverage or application rate. Depending on the sorbency of the substrate, the amount of cleaning composition added can be expressed as a multiple or percentage application relative to the weight of the substrate to give a saturation level. To illustrate, a saturation level of 200% means that cleaning composition is applied onto substrate in a 2:1 weight ratio relative to the weight of the substrate.

In various embodiments, a cleaning composition comprising 95% or more water is applied onto an absorbent substrate at saturation levels of 20% or greater, or at levels of 50% or greater. In particular embodiments, the saturation rate for application of the cleaning composition is 100% or greater, or 200% or greater. Maximum saturation levels are determined by the nature of the substrate and a desired level of incorporation of the cleaning compositions. In various embodiments, the saturation level is 1000% or lower or 500% or lower. In particular embodiments, the saturation level is less than 400% or less than 300%. In an exemplary embodiment, the saturation level is from about 200% to about 250%.

In general, relatively low levels of loading of the cleaning composition can be used to provide suitable wipes. In one aspect, the mildness of the cleaning composition in use is related to the relatively low concentrations of the components on the substrate. In addition, it is appreciated that irritation is also avoided because the wipes lack many components that can cause irritation or drying and chapping with prolonged use. Thus in various embodiments, the wipes are carefully formulated to avoid the presence of volatile organics, lyes, astringents, antipruritics, analgesics, keratolyics, and the like.

In an advantageous aspect of the invention, the formulated wipes for use by ostomy patients or their caregivers are also free of, or substantially free of, components that would interfere with the adhesion of the bag to the peristomal skin after cleaning. Thus in various embodiments, the wipes do not contain oils, lotions, or the like that leave the skin oily or greasy. In various aspects, the wipes are characterized by components that are not present as well as those mild cleaning components that are present. It is to be understood that some components that are purposefully omitted from the cleaning composition belong to more than one class of those listed here. The wipes in various embodiments are free of components that are volatile organic liquids, non-volatile organic liquids, oils (including silicone oils), emollients, lotions, fragrances, and skin irritants.

Example 1

Non-woven sheets of size 5.5 inches by 7 inches are impregnated with a cleaning composition to a saturation level of 200-250%. The sheets are made of 65% by weight viscose and 35% by weight polyethylene terephthalate fibers (PET), and have an areal weight of about 40 g/m$^2$. A suitable commercial product is LIDRO™ 40 g/m$^2$ sold by Jacob Holm Industries. The cleaning composition contains 96.8% water, 2% sodium cocoamphodiacetate, 1% polysorbate 20, 0.1% citric acid, 0.05% diazolidinyl urea, and 0.05% iodopropynyl butylcarbamate, where percentages are based on the total weight of the composition. The pH of the cleaning composition is 5.5 to 6.5. The wipes are packaged in a reclosable package along with instructions for their use as adhesive remover for stoma patients.

What is claimed is:

1. A method of removing adhesive, skin oils and dirt buildup from the peristomal skin area of a stoma in an ostomy patient, the method comprising contacting the skin around the stoma with a formulated wipe, the wipe comprising a substrate impregnated with a non-irritating cleaning composition, wherein the substrate is capable of absorbing and retaining a fluid therein, and the cleaning composition consists essentially of water; a non-lathering detergent; a non-foaming surfactant capable of dissolving the adhesive; an antimicrobially effective amount of a preservative composition; and a carboxylic acid in an amount sufficient to maintain the pH between 5.5 and 7.0; wherein the cleaning composition is free of emollients, oils, lotions, fragrances, and volatile solvents.

2. A method according to claim 1, wherein the non-foaming surfactant is a non-ionic surfactant having a hydrophile to lipophile balance (HLB) of 14 to 16.

3. A method according to claim 2, wherein the HLB is from 14.5 to 15.5.

4. A method according to claim 3, wherein the HLB is about 14.9 to 15.1.

5. A method according to claim 1, wherein the carboxylic acid comprises citric acid.

6. A method according to claim 1, wherein the non-lathering detergent comprises an imidazoline-based amphoteric surfactant.

7. A method according to claim 6, wherein the amphoteric surfactant comprises an amphoacetate or amphopropionate surfactant.

8. A method according to claim 1, wherein the preservative composition comprises 3-iodo-2-propynyl-N-butylcarbamate and diazolidinyl urea.

9. A method according to claim 2, wherein the non-foaming surfactant is an ethoxylated sorbitan ester.

10. A method according to claim 2, wherein the surfactant is polysorbate 20.

11. A method according to claim 1, wherein the cleaning composition consists essentially of water;

polysorbate 20;

sodium cocoamphoacetate or disodium cocoamphodiacetate;
citric acid;
diazolidinyl urea; and
iodopropynyl butylcarbamate.

12. A kit or packaged article comprising a plurality of formulated wipes and instructions for use of the wipes by an ostomy patient or the patient's caregiver to clean the peristomal skin and/or remove adhesive from around the patient's stoma, wherein the wipes comprise an absorbent or adsorbent insoluble substrate having a mild cleaning composition on at least on the surface of the substrate, and wherein the cleaning composition is free of volatile organic liquids, fragrances, oils, lotions, and emollients, and consists essentially of water; a non-ionic surfactant capable of removing adhesive; an ionic detergent; a carboxylic acid at a level sufficient to maintain the pH between 5.5 and 7; and an antimicrobially effective amount of a preservative composition.

13. A kit according to claim 12, wherein the substrate is a non-woven fabric.

14. A kit according to claim 12, wherein the non-ionic surfactant has an HLB of 14 to 16.

15. A kit according to claim 14, wherein the HLB is 14.5 to 15.5.

16. A kit according to claim 14, wherein the HLB is about 15.

17. A kit according to claim 12, wherein the ionic detergent is an imidazoline-based amphoteric surfactant.

18. A kit according to claim 17, wherein the detergent is an imidazoline-based amphoacetate surfactant.

19. A kit according to claim 17, wherein the detergent is an imidazoline-based amphopropionate surfactant.

20. A kit according to claim 12, wherein the carboxylic acid is citric acid.

21. A formulated wipe suitable for use by an ostomy patient or the patient's caregiver to remove adhesive or clean the skin around the patient's stoma, the wipes comprising a non-woven fabric substrate impregnated with a mild cleaning composition, wherein the mild cleaning composition is free of volatile organic liquids, oils, emollients, fragrances, and lotions, and consists essentially of water; a nonionic surfactant; an imidazoline-based amphoteric surfactant; an antimicrobially effective amount of a preservative composition; and citric acid.

22. A formulated wipe according to claim 21 wherein the mild cleaning solution is impregnated into the substrate by exposing the substrate to a composition comprising 95% or greater water by weight.

23. A formulated wipe according to claim 21, wherein the non-ionic surfactant has an HLB of 14 to 16.

24. A formulated wipe according to claim 21, wherein the non-ionic surfactant has an HLB of about 15.

25. A formulated wipe according to claim 21, wherein the amphoteric surfactant is an imidazoline-based amphoacetate surfactant.

26. A formulated wipe according to claim 21, wherein the amphoteric surfactant is an imidazoline-based amphopropionate surfactant.

27. A formulated wipe according to claim 21, wherein the detergent is an imidazoline-based amphoacetate or amphopropionate surfactant, and the nonionic surfactant is a sorbitan ester ethoxylate.

28. A formulated wipe according to claim 21, wherein the non-ionic surfactant is polysorbate 20, the imidazoline-based amphoteric surfactant is disodium cocoamphodiacetate, the carboxylic acid is citric acid, and the preservative composition comprises diazolidinyl urea and iodopropynyl butylcarbamate.

29. A formulated wipe according to claim 21 in the form of a rectangular or square sheet.

30. A formulated wipe according to claim 21 in the form of a mitt.

31. A sealed package comprising a plurality of formulated wipes according to claim 21.

32. A kit comprising a plurality of wipes according to claim 21 and instructions for their use by an ostomy patient or the patient's caregiver to use the wipes to clean the skin around the patients' stoma.

* * * * *